United States Patent
Schlegel et al.

(10) Patent No.: US 7,767,001 B2
(45) Date of Patent: *Aug. 3, 2010

(54) CONTACT AND ADSORBENT GRANULES

(75) Inventors: Andreas Schlegel, Krefeld (DE); Peter Bailly, Odenthal (DE); Jürgen Kischkewitz, Ratingen (DE); Klaus Rohbock, Kempen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 72 days.

This patent is subject to a terminal disclaimer.

(21) Appl. No.: 12/217,641

(22) Filed: Jul. 7, 2008

(65) Prior Publication Data

US 2008/0271600 A1    Nov. 6, 2008

Related U.S. Application Data

(62) Division of application No. 09/962,887, filed on Sep. 25, 2001, now abandoned.

(30) Foreign Application Priority Data

| Sep. 26, 2000 | (DE) | ................................. 100 47 996 |
| Mar. 29, 2001 | (DE) | ................................. 101 15 417 |
| Jun. 18, 2001 | (DE) | ................................. 101 29 306 |

(51) Int. Cl.
- *B01J 20/06* (2006.01)
- *B01J 20/28* (2006.01)
- *B01D 53/64* (2006.01)

(52) U.S. Cl. .................. 95/133; 210/688; 502/325

(58) Field of Classification Search .................. 96/108; 95/90, 133, 900; 210/660, 688, 263, 282, 210/502.1, 503, 504; 502/325, 326, 400; 423/210

See application file for complete search history.

(56) References Cited

U.S. PATENT DOCUMENTS

| 4,366,090 A |   | 12/1982 | Cariés .......................... 252/459 |
| 4,383,980 A | * | 5/1983  | Dines ........................... 423/54  |
| 4,459,370 A |   | 7/1984  | van der Wal et al. ......... 502/338 |
| 4,481,087 A |   | 11/1984 | DiGiacomo ................... 204/95  |
| 4,515,756 A |   | 5/1985  | Blumer ......................... 423/54  |
| 5,368,640 A |   | 11/1994 | Pitzer et al. .................. 106/456 |
| 5,502,021 A |   | 3/1996  | Schuster ...................... 502/400 |
| 5,948,726 A |   | 9/1999  | Moskovitz et al. .......... 502/415 |
| 7,407,588 B2 | * | 8/2008 | Schlegel ....................... 210/688 |
| 2008/0271601 A1 | * | 11/2008 | Schlegel et al. ................. 95/90 |
| 2008/0272054 A1 | * | 11/2008 | Schlegel et al. ............. 210/661 |

FOREIGN PATENT DOCUMENTS

| DE | 31 20 891 A1 | 12/1982 |
| DE | 38 00 873 A1 | 7/1988  |
| DE | 42 14 487 A1 | 11/1993 |
| DE | 43 20 003 A1 | 12/1994 |
| DE | 198 28 186 A1 | 12/1999 |
| EP | 0 704 500    | 4/1996  |
| JP | 55 132633    | 10/1980 |
| WO | 83/03595     | 10/1983 |
| WO | 99/50182     | 10/1999 |
| WO | WO 99/58236 | * 11/1999 |

OTHER PUBLICATIONS

Patent Abstracts of Japan, vol. 1996, No. 07, Jul. 31, 1996 & JP 08 059244 A (Toda Kogyo Corp), Mar. 5, 1996 Zusammenfassung.

* cited by examiner

*Primary Examiner*—Frank M Lawrence
(74) *Attorney, Agent, or Firm*—Nicanor A. Kohncke

(57) ABSTRACT

The present invention relates to pellets or granules based on iron oxides and/or iron oxyhydroxides and iron(III) hydroxide, a unit suitable for the through-flow of a fluid medium at least partially filled with an adsorbent/catalyst in pellet form consisting essentially of iron oxide and/or iron oxyhydroxide embedded in an iron hydroxide matrix, processes for their production comprising filtering, drying and shaping steps and their processes of their use.

10 Claims, No Drawings

CONTACT AND ADSORBENT GRANULES

This application is a Divisional of U.S. patent application Ser. No. 09/962,887 filed Sep. 25, 2001, now abandoned, entitled CONTACT AND ADSORBENT GRANULES, the contents of which are hereby incorporated by reference in their entirety.

BACKGROUND OF THE INVENTION

The present invention relates to particles, pellets or granules based on iron oxides and/or iron oxyhydroxides having a large specific surface area (50 to over 200 m$^2$/g according to BET), processes for their production and their conversion to pellet form with high mechanical resistance, and their use as a contact and/or adsorbent/catalyst for the catalysis of chemical reactions, for the removal of impurities from liquids and/or for gas purification.

Contact and adsorbent granules, including those based on iron oxides and/or iron oxyhydroxides, have already been described. They are predominantly used in continuous processes, whereby they are conventionally found in tower or column-type units through which the medium to be treated flows, and the chemical or physical reaction or adsorption processes take place at the outer and inner surface of the granules. Powdered materials cannot be used for this purpose because they compact in the direction of flow of the medium, thereby increasing the flow resistance until the unit becomes blocked. If a unit is cleaned by back-flushing (see below), large amounts of the powder are discharged and lost or cause an unacceptable contamination of the waste water.

The flowing media also exert forces on the granules, however, which can lead to abrasion and/or movement through to violent agitation of the granules. Consequently the granules collide, leading to undesirable abrasion. This results in loss of contact or adsorbent material and contamination of the medium to be treated.

Adsorbents/catalysts containing iron oxides and hydroxides can advantageously be used e.g. in the area of water purification or gas purification. In water purification this agent is used in horizontal- or vertical-flow filters or adsorber columns or added to the water to be treated in order to remove dissolved, suspended or emulsified organic or inorganic phosphorus, arsenic, antimony, sulfur, selenium, tellurium, beryllium, cyano and heavy metal compounds from, for example, drinking water, process water, industrial and municipal waste water, mineral, holy and medicinal water as well as river, garden pond and agricultural water. It can also be used in so-called reactive walls to separate the cited contaminants from ground water and seepage water aquifers from contaminated sites (waste disposal sites).

In gas purification the agent is used in adsorbers for binding undesirable components such as hydrogen sulfide, mercaptans and hydrogen cyanide, as well as other phosphorus, arsenic, antimony, sulfur, selenium, tellurium, cyano and heavy metal compounds in waste gases. Gases such as HF, HCl, H$_2$S, SO$_x$, NO$_x$ can also be adsorbed.

The removal of phosphorus, arsenic, antimony, selenium, tellurium, cyano and heavy metal compounds from waste oils and other contaminated organic solvents is also possible.

Contact and adsorbent granules based on iron oxides and/or iron oxyhydroxides are also used for the catalysis of chemical reactions in the gas phase or in the liquid phase.

Various methods of removing trace constituents and contaminants from aqueous systems with the aid of adsorbents are also known.

For example, DE-A 3 120 891 describes a process in which a filtration is performed using activated alumina with a grain size of 1 to 3 mm for the separation principally of phosphates from surface water.

DE-A 3 800 873 describes an adsorbent based on porous materials such as e.g. hydrophobed chalk with a fine to medium grain size to remove contaminants from water.

DE-A 3 703 169 discloses a process for the production of a granulated filter medium to treat natural water. The adsorbent is produced by granulating an aqueous suspension of kaolin with addition of powdered dolomite in a fluidised bed. The granules are then baked at 900 to 950° C.

A process for the production and use of highly reactive reagents for waste gas and waste water purification is known from DE-A 40 34 417. Mixtures consisting of Ca(OH)$_2$ with additions of clays, stone dust, entrained dust and fly ashes, made porous and having a surface area of approx. 200 m$^2$/g, are described here.

The cited processes and the contacts used therein have the shared disadvantage that the component responsible in each case for the selective adsorption of constituents of the media to be cleaned, in other words the actual adsorbent, must be supplemented with large quantities of additives to enable it to be shaped into granules. This significantly reduces the binding capacity for the water contaminants to be removed. Moreover, subsequent reprocessing or reuse of the material is problematic since the foreign substances used as binders first have to be separated out.

DE-A 4 214 487 describes a process and a reactor for the removal of impurities from water. The medium flows horizontally through a funnel-shaped reactor, in which finely divided iron hydroxide in flocculent form is used as a sorption agent for water impurities. The disadvantage of this process lies in the use of the iron hydroxide in flocculent form, which means that because there is little difference in density between water and iron hydroxide, a reactor of this type can be operated at only very low flow rates and there is a risk of the sorption agent, which is possibly already loaded with contaminants, being discharged from the reactor along with the water.

JP-A 55 132 633 describes granulated red mud, a by-product of aluminium production, as an adsorbent for arsenic. This consists of Fe$_2$O$_3$, Al$_2$O$_3$ and SiO$_2$. No mention is made of the stability of the granules or of the granulation process. A further disadvantage of this adsorbent is the lack of consistency in the composition of the product, its unreliable availability and the possible contamination of the drinking water with aluminium. Since aluminium is suspected of encouraging the development of Alzheimer's disease, contamination with this substance in particular is to be avoided.

DE-A 19 826 186 describes a process for the production of an adsorbent containing iron hydroxide. An aqueous polymer dispersion is incorporated into iron hydroxide in water-dispersible form. This mixture is then either dried until it reaches a solid state and the solid material then comminuted mechanically to the desired shape and/or size or the mixture is shaped, optionally after a preliminary drying stage, and a final drying stage then performed, during which a solid state is achieved. In this way a material is obtained in which the iron hydroxide is firmly embedded in the polymer and which is said to display a high binding capacity for the contaminants conventionally contained in waste waters or waste gases.

The disadvantage of this process lies in the use of organic binders, which further contaminate the water to be treated due to leaching and/or abrasion of organic substances. Furthermore, the stability of the adsorbent composite is not guaranteed in extended use. Bacteria and other microorganisms can also serve as a nutrient medium for an organic binder, presenting a risk that microorganisms may populate the contact and thereby contaminate the medium.

The presence of foreign auxiliary substances, which are required for the manufacture of the adsorbents, during reprocessing, recycling or reuse of used adsorbents is disadvantageous in principle because the reuse of pure substances is less problematic than is the case with mixed substances. For example, polymeric binders are disadvantageous when iron oxide-based adsorption materials are reused as pigments for concrete coloration because these binders can inhibit dispersion of the pigment in liquid concrete.

DE-A 4 320 003 describes a process for the removal of dissolved arsenic from ground water with the aid of colloidal or granulated iron hydroxide. Where fine, suspended iron(III) hydroxide products are used, it is recommended here that the iron hydroxide suspension be placed in fixed-bed filters filled with granular material or other supports having a high external or internal porosity. This process likewise has the disadvantage that, relative to the adsorbent "substrate+iron hydroxide", only low specific loading capacities are achievable. Furthermore, there is only a weak bond between substrate and iron hydroxide, which means that there is a risk of iron hydroxide or iron arsenate being discharged during subsequent treatment with arsenic-containing water. This publication also cites the use of granulated iron hydroxide as an adsorption material for a fixed-bed reactor. The granulated iron hydroxide is produced by freeze conditioning (freeze drying) of iron hydroxide obtained by neutralisation of acid iron(III) salt solutions at temperatures of below minus 5° C. This production process is extremely energy-intensive and leads to heavily salt-contaminated waste waters. Moreover, as a result of this production process only very small granules with low mechanical resistance are obtained. When used in a fixed-bed reactor, this means that the size spectrum is significantly reduced by mechanical abrasion of the particles during operation, which in turn results in finely dispersed particles of contaminated or uncontaminated adsorption agent being discharged from the reactor. A further disadvantage of these granules lies in the fact that the adsorption capacity in respect of arsenic compounds is reduced considerably if the granules lose water, by being stored dry for extended periods for example.

Adsorbent/binder systems obtained by removing a sufficiently large amount of water from a mixture of (a) a crosslinkable binder consisting of colloidal metal or non-metal oxides, (b) oxidic adsorbents such as metal oxides and (c) an acid such that components (a) and (b) crosslink to form an adsorbent/binder system, are known from U.S. Pat. No. 5,948,726. According to the embodiments, colloidal alumina or aluminium oxide is used as binder.

The disadvantage of these compositions lies in the need to use acid in their production (column 9, line 4) and in the fact that they are not pure but heterogeneous substances, which is undesirable both for the production, regeneration, removal and permanent disposal of such adsorbents, e.g. on a waste disposal site. The scope of disclosure of this publication is also intended to include adsorbents that are suitable for the adsorption of arsenic; specific examples are not provided, however. Aluminium oxide is known to be significantly inferior to iron oxides in regard to force of adsorption for arsenic.

Continuous adsorbers, which are commonly grouped together in parallel for operation, are preferably used for water treatment. To free drinking water from organic impurities, for example, such adsorbers are filled with activated carbon. At peak consumption times, the available adsorbers are then operated in parallel to prevent the flow rate from rising above the maximum permitted by the particular arrangement. At times of lower water consumption, individual adsorbers are taken out of operation and can be serviced, for example, whereby the adsorption material is subjected to special loads, as described in greater detail below.

The use of granules, which can be produced by compacting e.g. powdered iron oxide using high linear forces, has also already been considered. Such granules have already been described as a means of homogeneously colouring liquid concrete. The use of high linear forces for compacting is extremely expensive and energy-intensive, and the stability of the compacted materials is inadequate for extended use in adsorbers. The use of such materials in adsorbers, for example, particularly continuous models, for water purification is therefore of only limited interest. During maintenance or cleaning of adsorber plants by back-flushing in particular (see below), such granules lose large amounts of substance due to the associated agitation. The abraded material renders the waste water from back-flushing extremely turbid. This is unacceptable for a number of reasons: firstly, adsorption material, which is heavily laden with impurities and therefore toxic after extended use, is lost. Secondly, the stream of waste water is laden with abraded material, which can sediment, damaging piping systems and ultimately subjecting the waste treatment plant to undesirable physical and toxicological stresses, to name but a few reasons. Preferably the abrasion should be below 20% by weight, more preferably below 15% by weight, 10% by weight or most preferably below 5% by weight according to the method described in the examples of the present invention.

An object underlying the present invention was therefore to provide a particle like a contact or an adsorbent/catalyst based on iron-oxygen compounds in pellet form, exhibiting high mechanical resistance in conjunction with a good binding capacity for contaminants contained in liquids and gases without the need to use organic binders or inorganic foreign binders to achieve adequate mechanical resistance, and plants operated with such media. This complex object is achieved by the contacts or adsorbents/catalysts according to the invention, their preparation, their use and units filled therewith.

SUMMARY OF THE INVENTION

The invention relates to a unit suitable for the through-flow of a fluid medium at least partially filled with an adsorbent/catalyst in pellet form consisting essentially of iron oxide and/or iron oxyhydroxide embedded in an iron hydroxide matrix.

DETAILED DESCRIPTION OF THE INVENTION

The material in question consists essentially of iron oxide and/or oxyhydroxide firmly embedded in $Fe(OH)_3$ polymer, which—as experiments have shown—has a high binding capacity for the contaminants conventionally contained in waste water or waste gases and exhibits an already adequate mechanical and hydraulic resistance without addition of organic binders or inorganic foreign substances.

Since this material is free from foreign binders, it has the further advantage in comparison to adsorbents from the prior art that, after stripping or removal of the adsorbed contaminants where necessary, it can be disposed of completely or supplied to other applications, for instance after grinding it can be used for colouring concrete and other building materials and for conventional pigment applications in plastics, paints and varnishes or for colouring other substrates such as bark mulch or shredded wood.

To prepare adsorbents of this type, an aqueous suspension of iron oxyhydroxide and/or iron oxide and iron hydroxide is first prepared, which is either dried until it is solid and the solid material then optionally comminuted mechanically to the desired shape and/or size, or alternatively the dispersion undergoes mechanical shaping, optionally in the semisolid state after predrying, and is then (further) dried until it reaches a solid state.

The products obtainable in this way can then be comminuted further, for example by rough grinding or grinding. However, since the products reduce in size autogeneously on first coming into contact with water, for example when a freshly charged adsorber unit is first filled with water, this will generally be unnecessary.

The invention therefore also concerns a process for the production of an iron oxide/iron hydroxide-containing adsorbent/catalyst in pellet form.

The material according to the invention can be obtained by mixing diverse phases of iron oxides and/or iron oxyhydroxides, including $Fe(OH)_2$, in pure form or in any mixture in solid, semisolid or suspended form by the addition of $Fe(OH)_3$ in suspension or in gelatinous form with variable water content, and then dehydrating this mixture completely or with retention of a certain water content, for example by filtration or evaporation, and then mechanically comminuting the solid or semisolid material to the desired shape and/or size, or subjecting the dispersion to mechanical shaping, optionally in the semisolid state after predrying, followed by (additional) drying until a solid state is achieved. In this way the iron oxide and/or oxyhydroxide is firmly embedded in the $Fe(OH)_3$ polymer. The $Fe(OH)_3$ can also be produced in situ from Fe(III) salt solutions and neutralisation or from iron(II) salt solutions by oxidation and neutralisation. The residual alkali from the production process for the suspended pigment is preferably reacted with an equivalent amount of Fe(III) salt for this purpose.

The iron hydroxide $Fe(OH)_3$ is preferably aqueous to pasty in its original state, whereby the paste can exhibit almost any water content, generally between 10 and 90 wt. %, preferably between 40 and 70 wt. %. Freshly prepared iron hydroxide $Fe(OH)_3$, obtained by precipitation from iron(III) salt solutions or from iron(II) salt solutions by oxidation and neutralisation, can also be used, however.

Dehydration by evaporation is preferably used if the suspensions to be dehydrated are largely salt-free and/or if lower demands are made of the mechanical strength of the resultant end products in operation.

Dehydration can alternatively be performed by filtration. The filtration performance of the suspensions can be improved by the use of conventional filtration-improving measures, such as are described for example in Solid-Liquid Filtration and Separation Technology, A. Rushton, A. S. Ward, R. G. Holdich, 2nd edition 2000, Wiley-VCH, Weinheim, and in Handbuch der Industriellen Fest/Flüssig-Filtration, H. Gasper, D. Öchsle, E. Pongratz, 2nd edition 2000, Wiley-VCH Weinheim. Coagulants can thus be added to the suspensions, for example.

The suspensions to be dehydrated can also contain iron carbonates.

The products according to the invention can undergo drying in air, and/or in vacuo, and/or in a drying oven and/or on belt dryers or in spray dryers at temperatures in the range from 5 to 300° C. The material can also be freeze dried.

The products according to the invention preferably have a residual water content of less than 20 wt. %.

The material is preferably comminuted by grinding to grain sizes in the range between 0.5 and 20 mm. The semisolid material is preferably shaped mechanically in a granulation or pelletising plant or in an extruder, whereby shaped bodies whose size is in the range from 0.5 to 20 mm in diameter or length can be obtained.

It was found that the pellets or granules obtained in this way have a high binding capacity for contaminants contained in water, liquids or gases and they additionally have an adequately high resistance to flowing media in terms of mechanical or hydraulic stressing.

It is particularly surprising that during drying, the iron oxyhydroxides or iron oxides treated with $Fe(OH)_3$ solidify into very hard agglomerates, which without the addition of binders have a high mechanical abrasion resistance and high hydraulic resistance to contact with flowing water, and which have a high binding capacity for the contaminants and trace constituents contained in the water.

Iron oxyhydroxide pigments (e.g. goethite) and iron oxide pigments (e.g. haematite, magnetite) and/or iron carbonates are suitable for use according to the invention. The production of iron oxide pigments is prior art, they are obtained by precipitation and oxidation or Penniman reactions from iron (II) salt solutions and iron hydroxide by precipitation from iron(III) salt solutions. Such pigments can contain structures based on $\alpha, \beta, \gamma, \delta, \delta', \epsilon$ phases and/or $Fe(OH)_2$ and mixed and intermediate phases thereof. Yellow iron oxyhydroxides can be calcined to red iron oxides.

The product displays BET surface areas of 50 to 500 $m^2/g$, preferably 80 to 200 $m^2/g$.

The primary particle size was determined by measurement from scanning electron micrographs, e.g. at a magnification of 60000:1 (instrument: XL30 ESEM FEG, Philips). If the primary particles are needle-shaped, as in the $\alpha$-FeOOH phase for example, the needle width can be given as a measurement for the particle size. Needle widths of up to 100 nm, but mainly between 4 and 50 nm, are observed in the case of nanoparticle $\alpha$-FeOOH particles. $\alpha$-FeOOH primary particles conventionally have a length:width ratio of 5:1 to 50:1, typically of 5:1 to 20:1. The length:width ratio of the needle shapes can be varied, however, by doping or by special reaction processes. If the primary particles are isometric, as in the $\alpha$-$Fe_2O_3$, $\gamma$-$Fe_2O_3$, $Fe_3O_4$ phases for example, the particle diameters can quite easily also be below 20 nm.

By mixing $Fe(OH)_3$ with pigments and/or nanoparticle iron oxides or iron (oxy)hydroxides, the presence of the cited pigment or nucleus particles in their known particle morphology, held or glued together by the amorphous $Fe(OH)_3$ polymer, can be detected on the scanning electron micrographs.

Yellow iron oxyhydroxide pigments are generally synthesised by precipitating iron(II) hydroxides or carbonates from corresponding iron(II) salt solutions such as e.g. $FeSO_4$, $FeCl_2$ in pure form or as pickling solutions in the acid or alkaline pH range, followed by oxidation to iron(III) oxyhydroxides (see inter alia G. Buxbaum, Industrial Inorganic Pigments, VCH Weinheim, 2nd edition, 1998, p. 231ff). Oxidation of the divalent to the trivalent iron is preferably performed with air, whereby intensive aeration is advantageous. Oxidation with $H_2O_2$ also leads to iron oxyhydroxides. NaOH is preferably used as alkaline precipitant. Other precipitants, such as KOH, $Na_2CO_3$, $K_2CO_3$, CaO, $Ca(OH)_2$, $CaCO_3$, $NH_3$, $NH_4OH$, MgO and/or $MgCO_3$, can also be used, however.

By choosing suitable precipitation and oxidation conditions, nanoparticle $\alpha, \beta, \gamma, \delta$ phases and mixed phases of iron oxyhydroxides displaying a large specific surface area can be prepared, such that the nanoparticles agglomerate in the dry state and possess a high resistance to mechanical and fluid-mechanical abrasion in comminuted form. To steer the precipitated pigments in the direction of the extremely fine-particle character that is required, the precipitations, e.g. of yellow α-FeOOH as described in U.S. Pat. No. 2,558,303 and U.S. Pat. No. 2,558,304, are performed in the alkaline pH range with alkali carbonates as precipitants, and modifiers such as $SiO_2$, zinc, aluminium or magnesium salts, hydroxy-carbonic acids, phosphates and metaphosphates are generally added. Products produced in this way are described in U.S. Pat. No. 2,558,302. Such nucleus modifiers do not inhibit the subsequent reprocessing, recycling or any other use of the adsorbents according to the invention. In the case of precipitation processes in an aqueous medium, it is known that precipitations in an alkaline environment lead to less solidly agglomerated powders than those in an acid environment.

One of the advantages of nucleus modifiers, however, is that an adequate fine-particle character can be obtained even at elevated reaction temperatures.

The products described, the process for their production and their use represent an improvement over the prior art. In contrast to those of the prior art, the granules according to the invention can be subjected to considerably higher stresses and therefore display a much greater abrasion resistance to mechanical and hydraulic stressing. They can be used directly as such. When used in adsorber plants for water purification, for example, there is no need even for comminution or rough grinding of the crude dry substance initially obtained from filter cakes or extruders, since the coarse pellets break down independently on contact with water. This results in a random particle-size distribution, but no particles of such a size that they are discharged from the adsorber to any significant extent by the flowing medium.

There is absolutely no need for a separate granulation process, such as would be necessary when using conventional iron oxyhydroxides in the form of (flowable) powders, either with the aid of foreign binders or using extremely high linear forces during compacting.

Granulation of a semi-wet paste has proven effective as another method of producing granules. Here pellets or strands are formed from a semi-wet paste, e.g. using a simple perforated metal sheet, a roll press or an extruder, and either dried immediately or additionally shaped into a spherical or granular form by means of a spheroniser. The still wet spherules or granules can subsequently be dried to any moisture content whatsoever. A residual moisture content of <50% is recommended to prevent the granules from agglomerating. A spherical shape of this type can be advantageous for use in fixed-bed adsorbers due to the improved packing in the adsorber vessel that is obtained in comparison with rough-ground granules or pellets in strand form.

The quantities of iron oxyhydroxides or iron oxides on the one hand and iron hydroxide on the other to be used according to the invention are determined by the requirements of the product according to the invention in terms of its mechanical stability and abrasion resistance. Although a higher content of (powdered) pigments will generally reduce the mechanical strength of the products according to the invention, filtration of the suspensions is possibly made easier. The person skilled in the art and practising in the particular field of application will be able to determine the optimum mixing ratio for the intended application by means of a few orienting experiments.

The granules according to the invention are particularly preferably used in the cleaning of liquids, especially for the removal of heavy metals. A preferred application in this industrial field is the decontamination of water, particularly of drinking water. Particular attention has recently been paid to the removal of arsenic from drinking water. The granules according to the invention are extremely suitable for this purpose, since levels that not only meet but actually fall below even the lowest limiting values set by the US authority the EPA can be achieved using the granules according to the invention.

To this end the granules can be used in conventional adsorber units, such as are already used with a charge of activated carbon, for example, to remove other types of contaminants. Batchwise operation, in cisterns or similar containers for example, optionally fitted with agitators, is also possible. However, use in continuous plants such as continuous-flow adsorbers is preferred.

Since untreated water to be processed into drinking water conventionally also contains organic impurities such as algae and similar organisms, the surface of adsorbents, especially the outer surface of granular adsorbents, becomes coated during use with mostly slimy deposits, which impede or even prevent the inflow of water and hence the adsorption of constituents to be removed. For this reason adsorber units are periodically back-flushed with water, a process which is preferably performed at times of low water consumption (see above) on individual units that have been taken out of service. The adsorbent is whirled up and the associated mechanical stress to which the surface is subjected causes the undesirable coating to be removed and discharged against the direction of flow during active operation. The wash water is conventionally sent to a sewage treatment plant. The adsorbents according to the invention have proven to be particularly effective in this process, since their high strength enables them to be cleaned quickly without suffering any significant losses of adsorption material and without the back-flush water sent for waste treatment being rich in discharged adsorption material, which is possibly already highly contaminated with heavy metals.

Since the granules according to the invention are free from foreign binders, the material is comparatively easy to dispose of after use. For instance, the adsorbed arsenic can be removed by thermal or chemical means in special units, for example, resulting in an iron oxide pigment as a pure substance which can either be recycled for use in the same application or supplied for conventional pigment applications. Depending on the application and legal regulations, the content of the adsorber can also be used without prior removal of the heavy metals, for example as a pigment for colouring durable construction materials such as concrete, since the heavy metals removed from the drinking water are permanently immobilised in this way and taken out of the hydrological cycle.

The invention therefore also provides water treatment plants or waterworks in which units filled with the granules according to the invention are operated, and processes for the decontamination of water by means of such units, as well as such units themselves.

The BET specific surface area of the products according to the invention is determined by the carrier gas process (He: $N_2$=90:10) using the single-point method, according to DIN 66131 (1993). The sample is baked for 1 h at 140° C. in a stream of dry nitrogen before measurement.

In order to measure the adsorption of arsenic(III) and arsenic(V), 3 litres of an aqueous solution of $NaAsO_2$ or $Na_2HAsO_4$, each with the specified original concentration of approx. 2-3 mg/l arsenic, are treated with 3 g of the sample to be tested in a 5 liter PE flask for a specific period and the flask moved on rotating rollers. The adsorption rate of As ions on iron hydroxide over this specific period, e.g. one hour, is stated as $mg(As^{3+/5+})/g(FeOOH) \cdot h$, calculated from the balance of the $As^{3+/5+}$ ions remaining in solution.

The adsorption of $Sb^{3+}$, $Sb^{5+}$, $Hg^{2+}$, $Pb^{2+}$, $Cr^{6+}$ or $Cd^{2+}$ ions is measured in the same way, whereby the desired concentrations are established by dissolving appropriate amounts of $Sb_2O_3$, $KSb(OH)_6$, $PbCl_2$, $NaCrO_4$ or $CdCl_2$ in $H_2O$ and adjusting the pH value to 7-9.

The As, Sb, Cd, Cr, Hg or Pb contents of the contaminated iron oxyhydroxide or of the solutions are determined using mass spectrometry (ICP-MS) according to DIN 38406-29 (1999) or by optical emission spectroscopy (ICP-OES) according to EN-ISO 11885 (1998), with inductively coupled plasma as excitation agent in each case.

The mechanical and hydraulic abrasion resistance was assessed using the following method: 150 ml of demineralised water were added to 10 g of the granules to be tested, having particle sizes >0.1 mm, in a 500 ml Erlenmeyer flask, which was rotated on a LabShaker shaking machine (Kühner model from Braun) for a period of 30 minutes at 250 rpm. The >0.1 mm fraction was then isolated from the suspension using a screen, dried and weighed. The weight ratio between the amount weighed out and the amount weighed in determines the abrasion value in %.

The invention is described in greater detail below by means of examples. The examples are intended to illustrate the process and do not constitute a limitation.

EXAMPLES

Example 1

124 l of an aqueous NaOH solution (114 g/l) were measured out at 24° C. and 171 l of an aqueous solution of $FeSO_4$ (100 g/l) quickly added with stirring, and oxidation was then performed with 10 l air per hour and per mol Fe. Immediately upon completion of oxidation, 56 l of an aqueous solution of $Fe_2(SO_4)_3$ (100 g/l) were added and stirred for 30 minutes. The yellowish brown suspension thus obtained was processed in the same way as in example 2.

An X-ray diffractogram showed that the product consisted of 100% α-FeOOH. Using a scanning electron micrograph e.g. at a magnification of 60000:1, the needle widths were measured at between 15 and 35 nm, the needle lengths between 70 and 180 nm. The needles were extremely agglomerated. The BET specific surface area was 131 m²/g. The abrasion value after 30 minutes was only 7 wt. %.

The adsorption rate for an aqueous $NaAsO_2$ solution with an original concentration of 2.3 mg/l ($As^{3+}$) was 1.7 mg($As^{3+}$)/g(FeOOH)·h, the adsorption for an $Na_2HAsO_4$ solution with an original concentration of 2.7 mg/l ($As^{5+}$) was 1.2 mg($As^{5+}$)/g(FeOOH)·h.

Example 2

7.4 l of an aqueous solution of $Fe_2(SO_4)_3$ (100 g/l) were added to 7.5 l of an aqueous solution of $FeSO_4$ (150 g/l) and the mixture quickly treated with 2.9 l of an aqueous NaOH solution (200 g/l) at 34° C. with stirring. The reaction mixture was then pre-oxidised for 10 minutes with 290 l of air per hour and then precipitated further with 2.2 l of an aqueous NaOH solution (200 g/l) with stirring. The reaction mixture was then oxidised for a further 15 minutes with 290 l of air per hour. The yellowish brown suspension was filtered off at a nutsch filter and the deposit washed to obtain a residual filtrate conductivity of 1 mS/cm.

An X-ray diffractogram showed that the product consisted of 100% α-FeOOH. Small particles as well as needles can be seen in the scanning electron micrograph, e.g. at a magnification of 60000:1. In the case of the small particles the needle widths were measured at between 15 and 35 nm, the needle lengths between 30 and 70 nm. In the case of the larger needles, needle widths of up to 50 nm and needle lengths of up to 350 nm were determined. The needles and particles were extremely agglomerated. The BET specific surface area was 177 m²/g. The abrasion value after 30 minutes was only 3 wt. %.

The adsorption rate for an aqueous $NaAsO_2$ solution with an original concentration of 2.3 mg/l ($As^{3+}$) was 1.3 mg($As^{3+}$)/g(FeOOH)·h, for an $Na_2HAsO_4$ solution with an original concentration of 2.7 mg/l ($As^{5+}$) it was 0.7 mg($As^{5+}$)/g(FeOOH)·h.

Example 3

470 ml of an $FeCl_3$ solution (0.1 N) were added to 45 g of a needle-shaped α-FeOOH pigment powder (Bayferrox® 930, Bayer AG, Leverkusen, Del.) and mixing performed for 5 minutes at 500 rpm. 141 ml of an aqueous NaOH solution (1 N) were then slowly added dropwise and the suspension stirred for 15 minutes.

The suspension was filtered through a nutsch filter, rinsed with 1000 ml demineralised $H_2O$ and then dried for 15 h at 105° C. 47.6 g of the dried product was redispersed in 2300 ml 0.1 M $FeCl_3$ solution and 690 ml of an aqueous NaOH solution (1 N) were then quickly added. The suspension was filtered through a nutsch filter, rinsed with 2000 ml demineralised $H_2O$ and then dried for 15 h at 105° C. The dried product was very hard, it was roughly ground and the screen fraction from 1 to 5 mm isolated.

An X-ray diffractogram showed that the product consisted of 100% α-FeOOH. The BET specific surface area was 99 m²/g. When shaken with water in a beaker, the granules displayed a high abrasion resistance, indicated by the fact that the water was not coloured with pigment, as happens with untreated α-FeOOH pigment powder (Bayferrox® 930), for example.

The adsorption rate for an aqueous $NaAsO_2$ solution with an original concentration of 23 μg/l $As^{3+}$, as can conventionally occur in natural water, for example, was 17 μg($As^{3+}$)/g(FeOOH)·h after 30 minutes, corresponding to 84% adsorption.

Example 4

4096 kg NaOH (as solution with approx. 300 g/l) were measured out and diluted with water to 40 m³. 4950 kg $FeSO_4$ were dissolved with water to form 48.5 m³ solution, cooled to 15° C. and then pumped into the prepared NaOH over 1 h. The suspension was then oxidised with 1500 m³/h air in approx. 2 h. 14.4 m³ $FeClSO_4$ solution (113.4 g/l) were added to approx. 87 m³ of this suspension with stirring, and stirred for a further 30 min. The batch was washed on a filter press until the residual filtrate conductivity was <1000 μS/cm and the paste pushed through a perforated metal plate with hole diameters of 7 mm and formed into strands. The strands were dried on a belt dryer to a residual moisture of approx. 5%. The dry pellets were roughly ground to obtain a particle size of 2 mm. The material thus obtained had a BET specific surface area of 142 m²/g and consisted of 100% α-FeOOH. Using a scanning electron micrograph e.g. at a magnification of 60000:1, the needle widths were measured at between 15 and 50 nm, the needle lengths between 10 and 150 nm. The needles were extremely agglomerated.

Adsorption performance: The adsorption rate for $NaAsO_2$ with an original concentration of 2.7 mg/l ($As^{3+}$) was 2.1 mg($As^{3+}$)/g(FeOOH)·h, for $Na_2HAsO_4$ with an original concentration of 2.8 mg/l ($As^{5+}$) it was 2.0 mg($As^{5+}$)/g(FeOOH)·h, for $CdCl_2$ (original concentration 2.7 mg ($Cd^{2+}$)/l) the adsorption was 1.1 mg ($Cd^{2+}$)/g(FeOOH)·h, for $KSb(OH)_6$ (original concentration 2.6 mg ($Sb^{5+}$)l) it was 1.9 mg ($Sb^{5+}$)/g(FeOOH)·h, for $Sb_2O_3$ (original concentration 2.3 mg ($Sb^{3+}$)/l) it was 2.0 mg ($Sb^{3+}$)/g(FeOOH)·h, for $Na_2CrO_4$ (original concentration 2.6 mg ($Cr^{6+}$)/l) it was 1.1 mg ($Cr^{6+}$), for $PbCl_2$ (original concentration 1.6 mg ($Pb^{2+}$)/l) it was 1.57 mg ($Pb^{2+}$)/g(FeOOH)·h.

Example 5

800 g of an aqueous solution of $FeCl_3$ (100 g/l) were added to 525 g of a suspension of a needle-shaped α-FeOOH pigment powder (50 g/l FeOOH, Bayferrox® 920, Bayer AG, Leverkusen, Del.) and an iron hydroxide precipitated on the pigment by addition of 247 g of an aqueous NaOH solution (24%). The suspension was filtered through a nutsch filter, the filter cake rinsed to obtain a residual filtrate conductivity of <1 mS/cm and the filter cake then dried in a drying oven at 75° C. The very hard material was then roughly ground to form granules having a particle size of between 0.2 and 2 mm. The BET specific surface area was 64 $m^2$/g. The scanning electron micrograph, e.g. at a magnification of 60000:1, shows that the α-FeOOH type needles are agglomerated or glued together by amorphous layers.

The adsorption rate for an aqueous $NaAsO_2$ solution with an original concentration of 2.9 mg/l ($As^{3+}$) was 1.8 mg($As^{3+}$)/g(FeOOH)·h, for an $Na_2HAsO_4$ solution with an original concentration of 2.8 mg/l ($As^{5+}$) it was 1.6 mg($As^{5+}$)/g(FeOOH)·h.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An adsorbent/catalyst granule comprising α-FeOOH having a BET surface area of 50 to 500 $m^2$/g and mechanical and hydraulic abrasion resistance of <7%.

2. The adsorbent/catalyst granule according to claim 1, wherein the adsorbent/catalyst granule has an arsenic (III) adsorption of >56.5%.

3. The adsorbent/catalyst granule according to claim 1, wherein the adsorbent/catalyst granule has an arsenic (V) adsorption of >25.9%.

4. The adsorbent/catalyst granule according to claim 1, wherein the adsorbent/catalyst granule has a residual moisture of <50%.

5. The adsorbent/catalyst granule according to claim 1, wherein the adsorbent/catalyst granule has a size of from 0.2 to 5 mm.

6. A process for removing impurities from a gas, comprising:
   providing a gas containing one or more impurities, and
   contacting the gas with the adsorbent/catalyst granule according to claim 1.

7. A process for removing impurities from a liquid, comprising:
   providing a liquid containing one or more impurities, and
   contacting the liquid with the adsorbent/catalyst granule according to claim 1.

8. The process according to claim 7, wherein the liquid is water.

9. The process according to claim 8, wherein the one or more impurities are chosen from liquid metals, phosphorus, antimony, beryllium, selenium, tellurium, cadmium, chromium and cyano compounds.

10. The process according to claim 8, wherein the one or more impurities includes arsenic.

* * * * *